(12) United States Patent
Yeh

(10) Patent No.: US 6,988,920 B2
(45) Date of Patent: Jan. 24, 2006

(54) SLIDER HAVING IMPROVED RESISTANCE TO EROSION AND WEAR

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 0 days.

(21) Appl. No.: 10/797,094

(22) Filed: Mar. 11, 2004

(65) Prior Publication Data

US 2004/0176001 A1    Sep. 9, 2004

Related U.S. Application Data

(63) Continuation of application No. 10/386,634, filed on Mar. 13, 2003, which is a continuation of application No. 10/040,404, filed on Jan. 9, 2002, now abandoned.

(51) Int. Cl.
    *B63B 1/00*    (2006.01)
(52) U.S. Cl. .......................................... 441/65; 441/74
(58) Field of Classification Search .................. 441/65, 441/74

See application file for complete search history.

(56) References Cited

U.S. PATENT DOCUMENTS

| | | | | |
|---|---|---|---|---|
| 4,752,260 A | * | 6/1988 | Stewart | 441/65 |
| 4,850,913 A | * | 7/1989 | Szabad, Jr. | 441/65 |
| 5,211,593 A | * | 5/1993 | Schneider et al. | 441/65 |
| 5,238,434 A | * | 8/1993 | Moran | 441/74 |
| 5,558,551 A | * | 9/1996 | Irby | 441/65 |
| 5,647,784 A | * | 7/1997 | Moran | 441/65 |
| 5,658,179 A | * | 8/1997 | Glydon et al. | 441/74 |

\* cited by examiner

*Primary Examiner*—Lars A. Olson
(74) *Attorney, Agent, or Firm*—Rosenberg, Klein & Lee

(57) ABSTRACT

A slider resists erosion due to moisture, dirt and ultraviolet of sunlight and protects a pattern or the bonded surface from wear and tear. The slider contains a foam core, a top layer, a pattern, and a bottom layer. The foam core has a top surface, a bottom surface and edge surfaces. The top layer is a composite layer heat laminated to the top surface and edge surfaces of the foam core. The pattern is formed within the top layer and visible from outside of the top layer. The bottom layer is heat laminated to the bottom surface of the foam core.

14 Claims, 9 Drawing Sheets

SLIDER HAVING IMPROVED RESISTANCE TO EROSION AND WEAR

CROSS REFERENCE TO RELATED APPLICATION

This application is a continuation-in-part application of co-pending U.S. application Ser. No. 10/386,634 filed Mar. 13, 2003, which is a continuation-in-part application of the U.S. application Ser. No. 10/040,404 application filed Jan. 9, 2002, now abandoned.

TECHNICAL FIELD

This invention relates generally to a slider, used for sliding on snow, grass, sand or the like. The slider is a foam core to which layer are laminated to protect against erosion, wear and ultraviolet light. In the context of this specification, the slider is anyone of the embodiments. The slider is a bodyboard, a snow board, a snow sled, a grass sliding board, sand sliding board, surfing board or the like.

BACKGROUND OF THE INVENTION

The slider of the prior art is a board made of plastic that has handles attached on the surface of the board and has a design printed in a central area of the board. The plastic is typically a hard plastic in order that the board could be wear resistant. However, the solid plastic board is generally not comfortable for the user and the board is also heavy for the users, especially children to carry. Besides, the design simply printed on the surface of the board is easily worn off due to the frequent contact with the user.

Another slider of the prior art is a board made of expanded foam. An outer film is generally laminated to a top surface of the foam board and several strips are laminated to edges of the foam board. The slider made of foam is more comfortable for the users to contact with and lighter for the users to carry with than a slider made of solid plastic. However, It is known that the ultraviolet damages of expanded foam; furthermore, the outer film and the strip also degrade under the sunshine after a period of time. Air-cells of the foam board fracture when abraded. Once the air-cells are broken, water retains in the open cells and erosion reduces the life of the slider. Furthermore, the design of a slider mostly is printed on the outer film and the strips; therefore, the design on the board deteriorates very quickly.

The designs or patterns on the sliders are convenient means for the owners to identify their sliders. Therefore, an enduring pattern of the slider performs a useful and decorative function.

SUMMARY OF INVENTION

It is a primary object of the invention to provide a slider whose surfaces resist accelerated erosion due to moisture, dirt and ultraviolet sunlight.

It is another object of the invention that a pattern imprinted on the slider resists wear and tear.

Another object of the invention is that the slider is comfortable to the touch.

In one embodiment, this invention discloses a slider comprising a foam core, a top layer, a pattern, and a bottom layer. The foam core has a top surface, a bottom surface and edge surfaces. The top layer is a composite layer heat laminated to the top surface and edge surfaces of the foam core. A pattern is formed within the top layer and the pattern is visible from outside of the top layer. The bottom layer is heat laminated to the bottom surface of the foam core.

In another embodiment, this invention comprises a top layer comprising an outer film, an inner film, a pattern, and a foam skin. The outer film has a top surface and a bottom surface, which the pattern is printed on. The inner film has a top surface heat laminated to the bottom surface of the outer film and a bottom surface, which heat laminate to a top surface of the foam skin. A bottom surface of the foam skin is heat laminated to the top surface and edge surfaces of the foam core.

In a further embodiment, this invention comprises a bottom layer comprising a foam skin and a plastic board. The foam skin has a top surface, which is heat laminated to the bottom surface of the foam core and a bottom surface, which is heat laminated to the plastic board. The plastic board is a composite board and a pattern is printed within the plastic board.

Other features of the invention include bonding films that enable foam materials such as polystyrene to be heat laminated to polyethylene.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
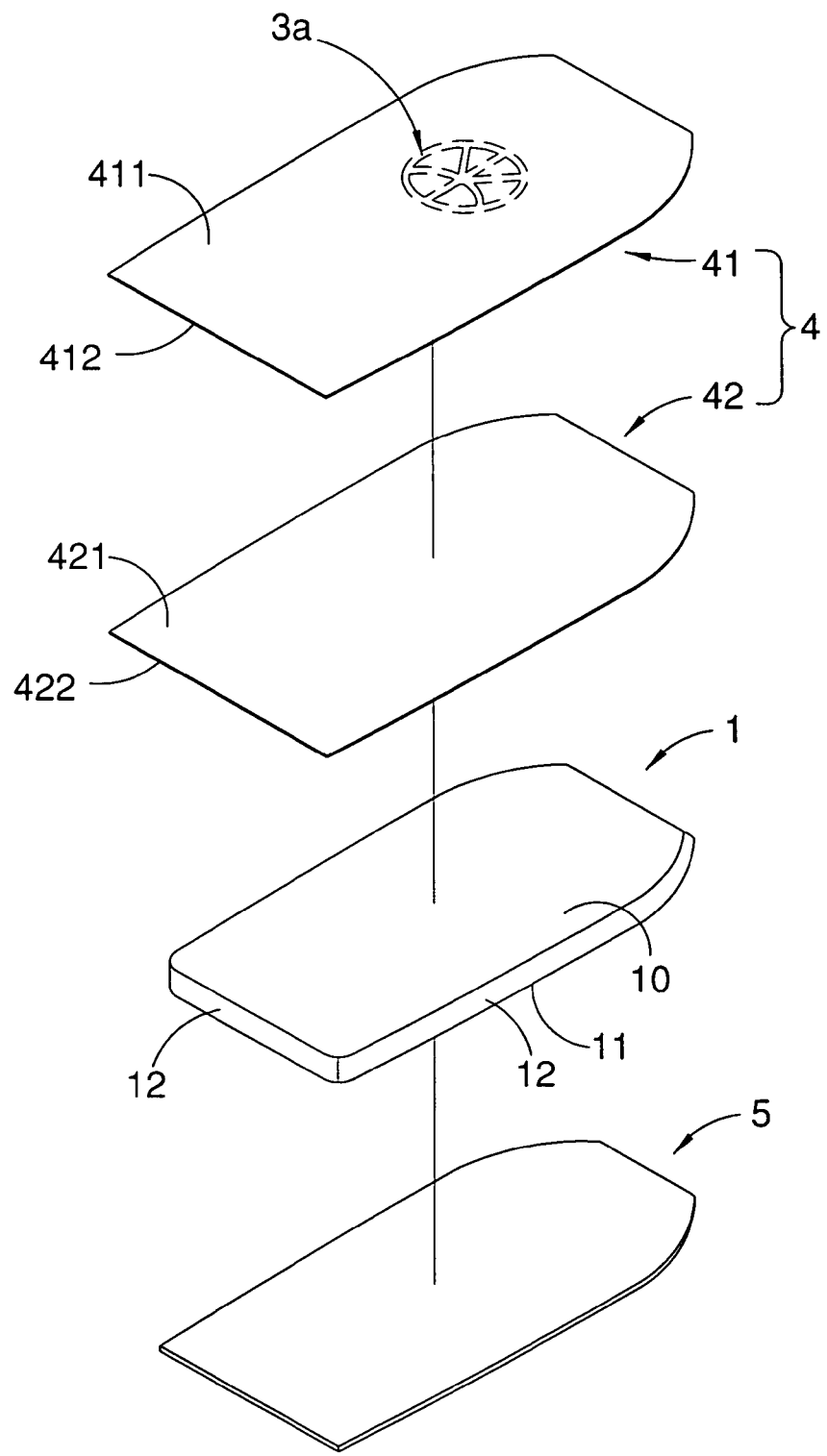
FIG. 1 is an exploded prospective view of the first embodiment of the present invention.
Figure 2:
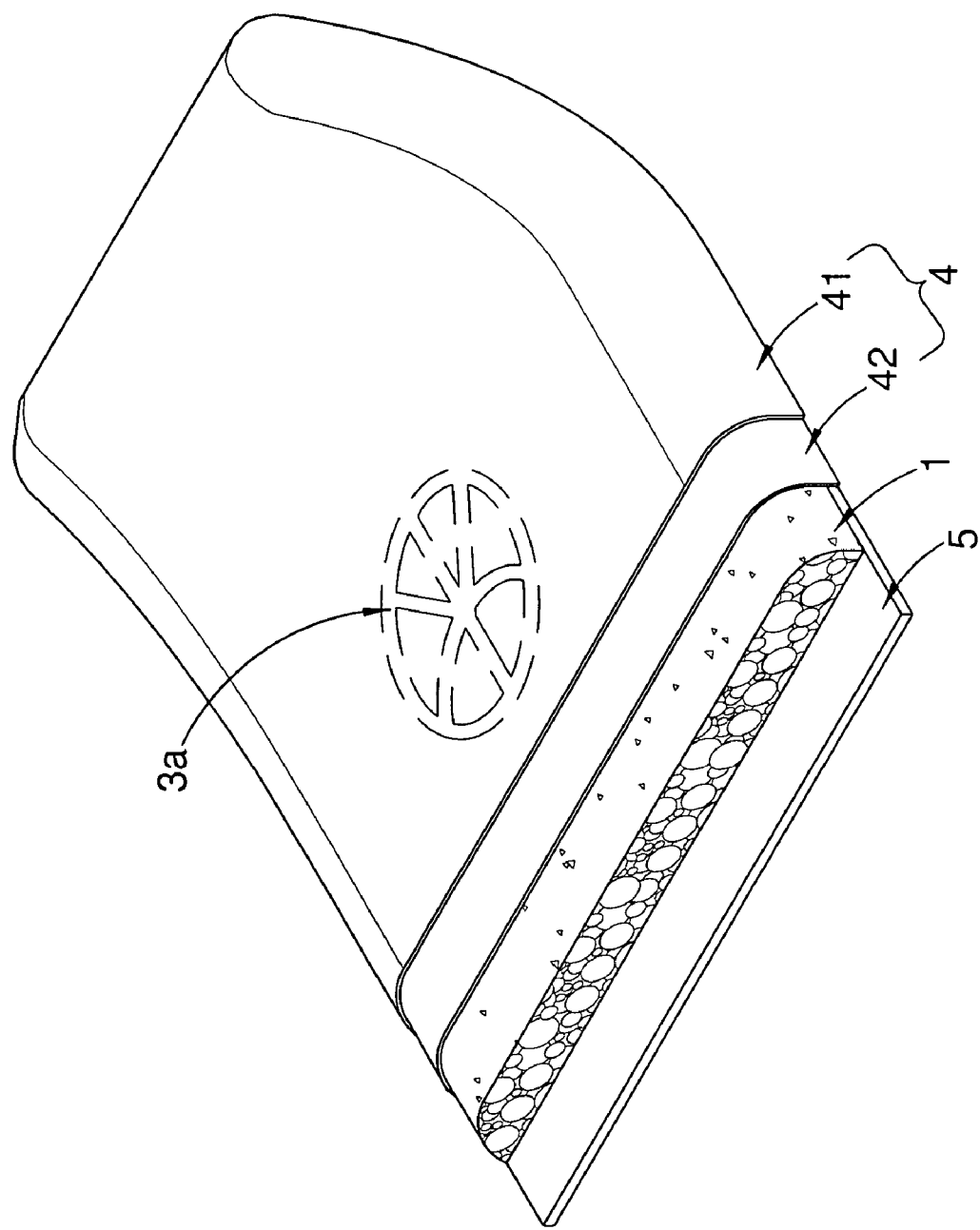
FIG. 2 is a cross sectional view of the first embodiment of the present invention.
Figure 3:
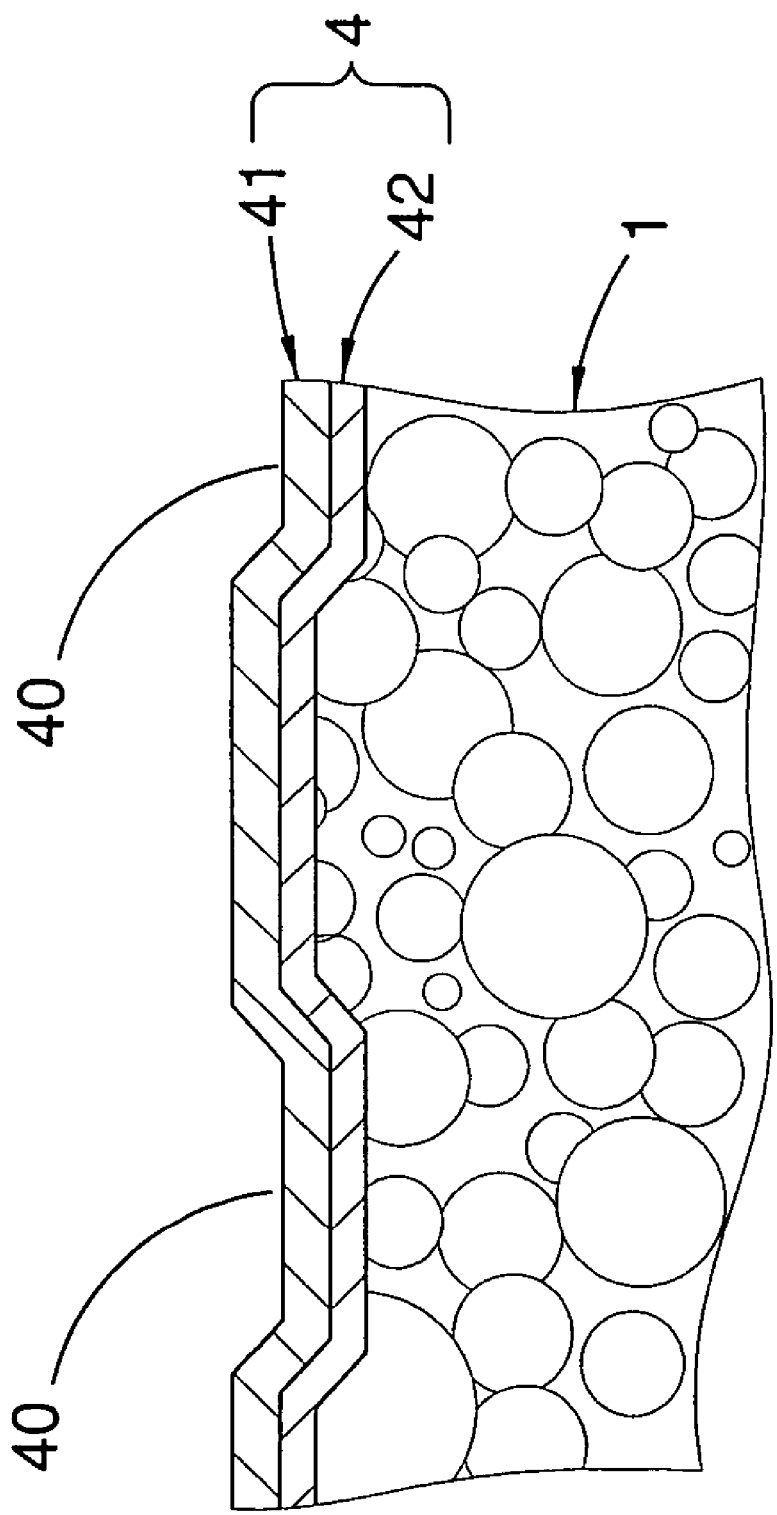
FIG. 3 is a regionally enlarged cross sectional view of the first embodiment of the present invention.

With reference to FIG. 1, FIG. 2 and FIG. 3, the first embodiment of the present invention comprises a foam core 1, a top layer 4, a first pattern 3a, and a bottom layer 5. The foam core 1 has a top surface 10, a bottom surface 11 and edge surfaces 12. The top layer 4 is heat laminated to the top surface 10 and edge surfaces 12 of the foam core 1, and the bottom layer 5 is heat laminated to the bottom surface 11 of the foam core 1. The foam core 1 is made of polyethylene and has a density in the range of 1.2 to 8 PCF (pounds per cubic foot) so the foam core is light and flexible. Furthermore, both a single and a composite foam core apply to this invention.

The top layer 4 is a composite layer, which comprises a first outer film 41 and a first inner film 42. Both the first outer film 41 and first inner film 42 are made plastic. The first pattern 3a is printed on a bottom surface 412 of the first outer film 41 and is visible from outside of the first outer film 41. The first inner film 42 has a top surface 421 which is heat laminated to the bottom surface 412 of the first outer film 41. The first pattern 3a is thereby protected from direct exposure to the outside of environment. A bottom surface 422 of the first inner film 42 is heat laminated to the top surface 10 and edge surfaces 12 of the foam core 1. In addition, the first outer film 41 is made of a transparent material so the first pattern 3a is visible from outside of the slider.

A preferred method for making the slider is described as follows: (1) making the first outer film 41 having a thickness in the range from 0.02 mm to 0.15 mm by extrusion; (2) printing the first pattern 3a on the bottom surface 412 of the first outer film 41 using black and white printing or color printing techniques; (3) extruding the first inner film 42 in the range from 0.01 mm and 0.15 mm by the extrusion machine; (4) spreading the molten first inner film 42 on the bottom surface 412 of the first outer film 41, providing the first inner film 42 not only is heat laminated to the bottom surface 412 of the fist outer film 41 but also overlays the first pattern 3a; and (5) heating the bottom surface 422 of the first inner film 42 to molten conditions and pressing the top layer 4 to the top surface 10 and the edge surfaces 12 of the foam core 1. The process of combining the first outer film 41 and the first inner film 42 or combining the first inner film 42 and the foam core 1 is called heat laminating, alternatively heat fusion or heat sealing.

During the process of combining the top layer 4 and the foam core 1, the top layer 4 is placed on a hot mold (not shown). The mold surface has a plurality of embossments, when the mold surface covered by the top layer 4 is pressed against the foam core 1, concaves 40 are formed; therefore the top surface 411 of the first outer film 41 forms a plurality of concaves 40 forming depressions in the surface of the foam core 1. The concaves 40 enhance the area of contact between the top layer 4 and the foam core 1 thereby increasing the strength of the seal of the top layer 4 and the foam core 1. Furthermore, the concaves 40 enable the users to grab the slider with greater tenacity.

Figure 4:
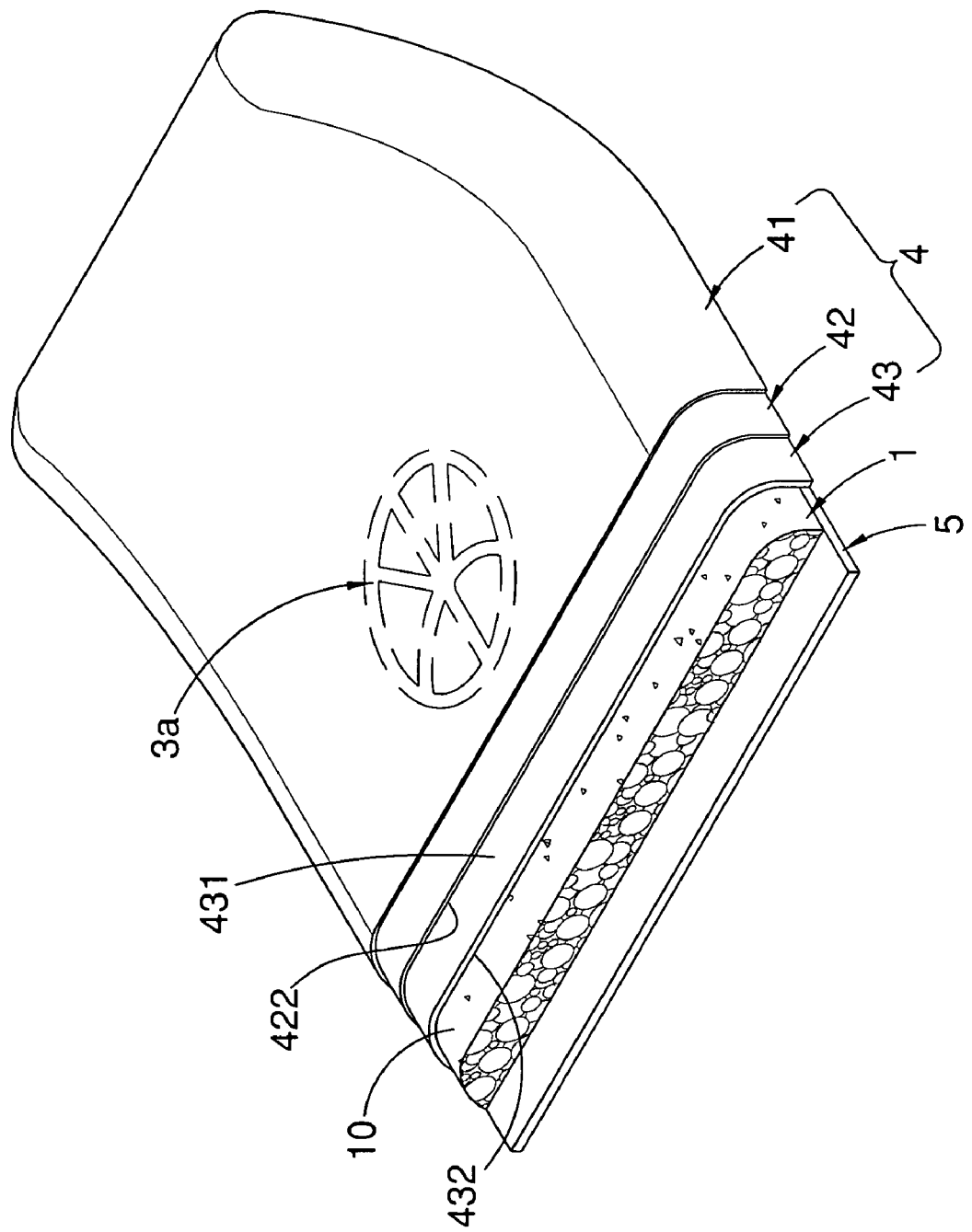
FIG. 4 is a cross sectional view of the second embodiment of the present invention.

With reference to FIG. 4, the second embodiment of the present invention includes the entire structure of the FIG. 1 to FIG. 3, such as a foam core 1, a top layer 4, a first pattern 3a, and a bottom layer 5. In FIG. 4 the top layer 4 further comprises a first polyethylene foam skin 43 interposed between the first inner film 42 and the top surface 10 and edges surfaces 12 of the foam core 1. In addition, the first polyethylene foam skin 43 has a top surface 431 heat laminated to the bottom surface 422 of the first inner film 42 and a bottom surface 432 heat laminated to the top surface 10 and edge surfaces 12 of the foam core 1. The first polyethylene foam skin 43 has a greater density than the foam core 1 and has a density in the range of 1.5 to 10 PCF. Therefore, the first polyethylene foam skin 43 has smoother surfaces, which also improve the surface of the top layer 4 to have smooth and tight surfaces during the heat lamination to the first foam skin 43.

Figure 5:
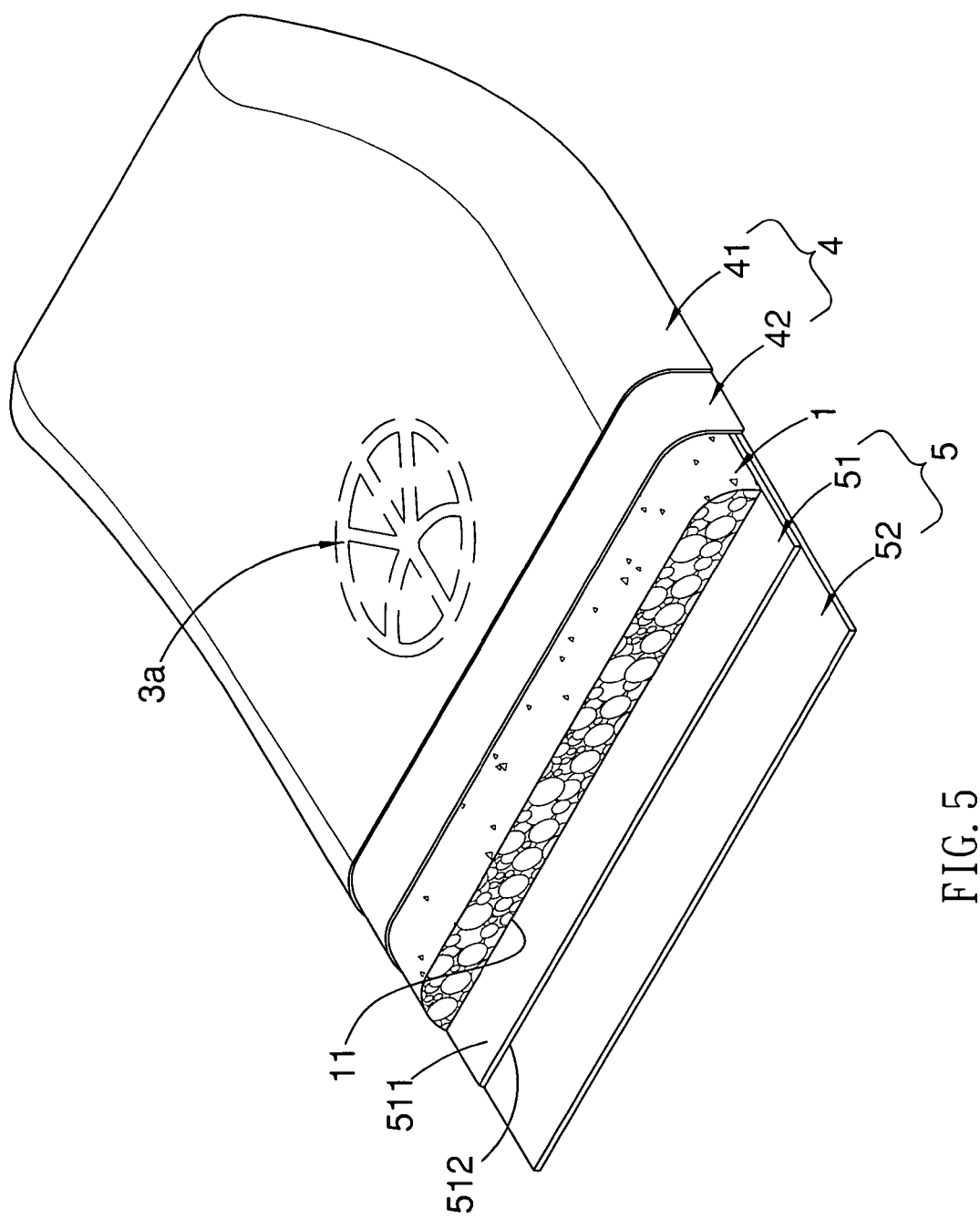
FIG. 5 is a cross sectional view of the third embodiment of the present invention.

FIG. 5 is a third embodiment of the present invention, which includes all the embodiments of the first embodiment, such as a foam core 1, a top layer 4, a first pattern 3a, and a bottom layer 5. In FIG. 5, the bottom layer 5 is a composite layer and comprises a second polyethylene foam skin 51 and a plastic board 52. The second polyethylene foam skin 51 has a top surface 511 being heat laminated to the bottom surface 11 of the foam core 1 and a bottom surface 512 being heat laminated to the plastic board 52. The second polyethylene foam skin 51 has a greater density than the foam core 1 and has a density in the range of 1.5 to 10 PCF.

A preferred method for making the bottom layer 5 of the third embodiment is described as follows: (1) extruding the plastic plate 52 to a thickness in range from 0.3 mm to 1.5 mm; and (2) spreading the molten plastic board 52 on the bottom surface 512 of the second polyethylene foam skin 51. Therefore, the plastic board 52 is tightly heat laminated to the second polyethylene foam skin 51. Thereafter, heating the top surface 511 of the second polyethylene foam skin 51 to a softened state and then laminating the bottom layer 5 to the bottom surface 11 of the foam core 1. The bottom layer 5 is tightly heat laminated to the polyethylene foam core 1.

Figure 6:
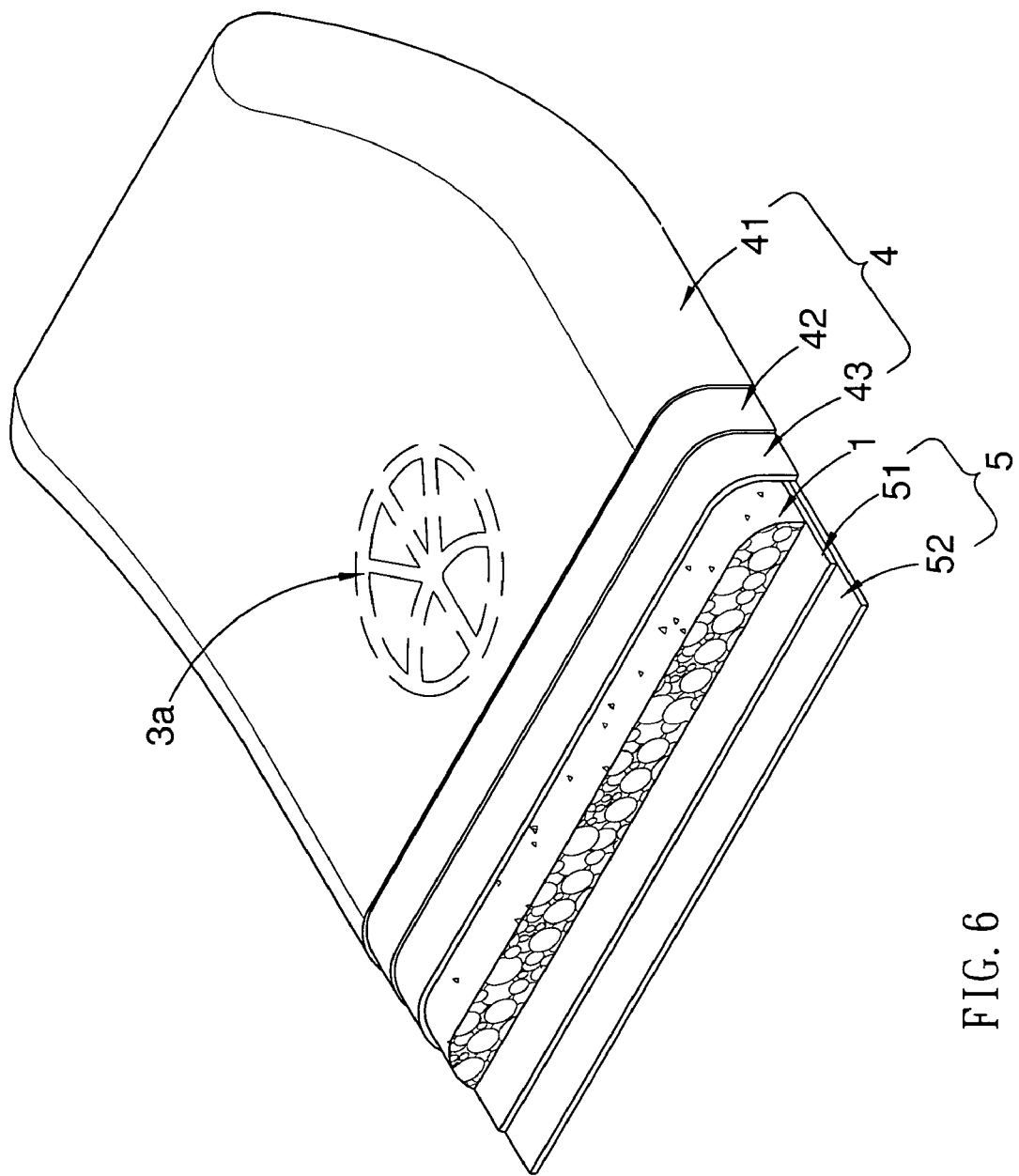
FIG. 6 is a cross sectional view of the fourth embodiment of the present invention.

With reference to FIG. 6, the fourth embodiment of the invention comprises all the elements of the second embodiment. In FIG. 6, the bottom layer 5 further comprises a second polyethylene foam skin 51 and a plastic board 52. The second polyethylene foam skin 51 has a top surface 511 being heat laminated to the bottom surface 11 of the foam core 1 and a bottom surface 512 being heat laminated to the plastic board 52. The second polyethylene foam skin 51 has a greater density than the foam core 1 and has a density in the range of 1.5 to 10 PCF.

Figure 7:
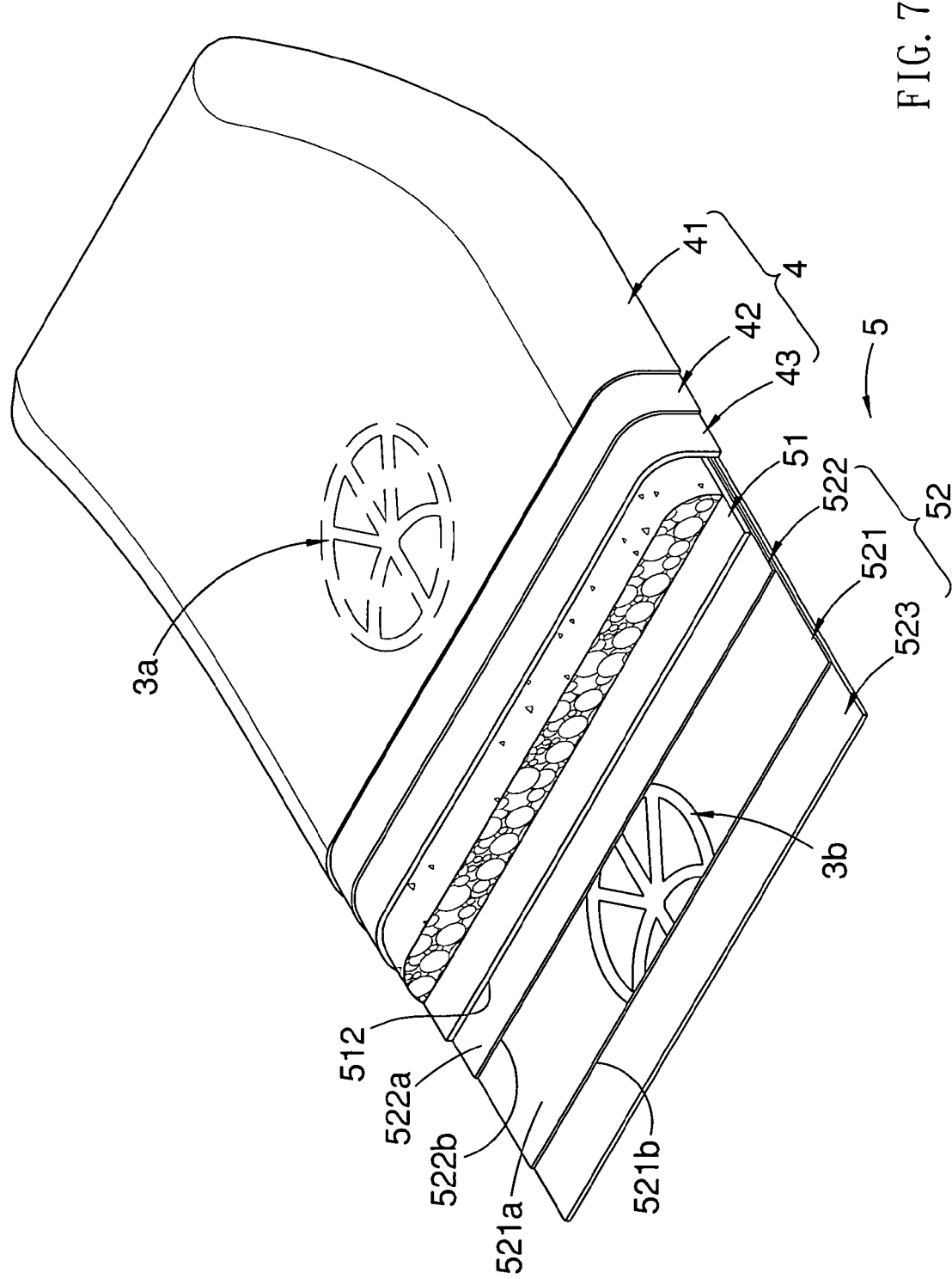
FIG. 7 is a cross sectional view of the fifth embodiment of the present invention.

FIG. 7 is the fifth embodiment of this invention comprises all the elements of the fourth embodiment. In addition, the plastic board 52 of the fifth embodiment further comprises a second pattern 3b, a second outer film 521, a second inner film 522, and a plate 523. The second outer film 521, second inner film 522 and the plate 523 are made plastic. The second pattern 3b is printed on a top surface 521a of the second outer film 521 and is visible from outside of the second outer film 521. The second inner film 522 has a top surface 522a heat laminated to the bottom surface 512 of the second polyethylene foam skin 51 and a bottom surface 522b heat laminated to the top surface 521a of the second outer film 521. The second pattern 3b is thereby protected from direct exposure to the outside of environment. In addition, the second outer film 521 is made of a transparent material so the second pattern 3b is visible from outside of the slider.

Figure 8:
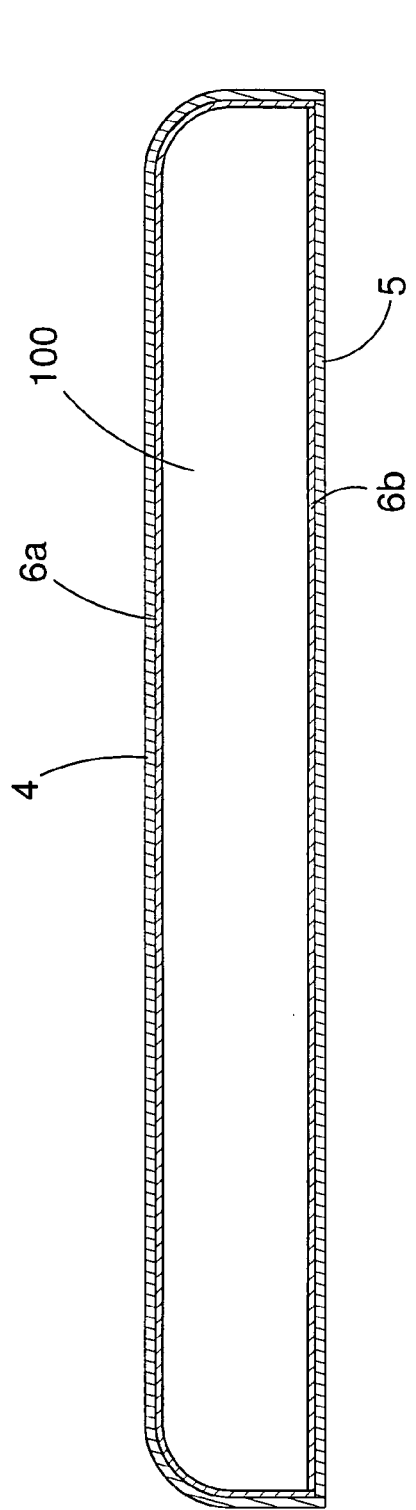
FIG. 8 is a cross sectional view of the sixth embodiment of the present invention.

With reference to FIG. 8, the sixth embodiment of the invention comprises a foam core 100 made of non-polyethylene materials, such as polystyrene and polypropylene materials and has a density in the range of 0.8 to 8 PCF. The sixth embodiment comprises a top layer 4, a first bonding film 6a, a second bonding film 6b and a bottom layer 5. Polystyrene is inexpensive and easy to extrude as the foam core 100. However, it is difficult to heat laminate polyethylene directly to polystyrene. Therefore, the first bonding film 6a and the second bonding film 6b are used to overcome the lamination problems. In FIG. 8, the top layer 4 is heat laminated to the top and edge surfaces of the foam core 100 by the bonding film 6a. The bottom layer 5 is heat laminated to the bottom surface of the foam core 100 by the bonding film 6b.

Figure 9:
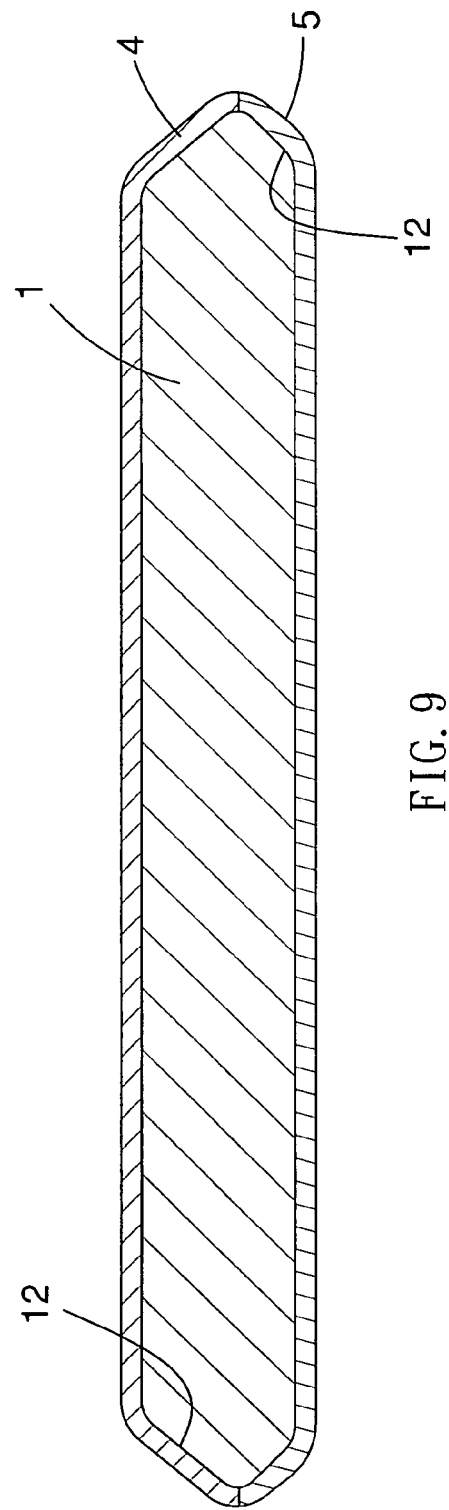
FIG. 9 is a cross sectional view of the seventh embodiment of the present invention.

With reference to FIG. 9, the seventh embodiment of the invention comprised a foam core 1, a top layer 4, and a base plate 5. The top layer 4 is heat laminated to the top surface and extends around the upper half of the edge surfaces 12 of the foam core 1. The bottom layer 5 is heat laminated to the bottom surface and extends around the lower half of the edge surfaces 12 of the foam core 1. Therefore, both edges of the top layer 4 and bottom layer 5 sealed. The structure of the seventh embodiment also applies to the above-mentioned embodiments.

Figure 10:
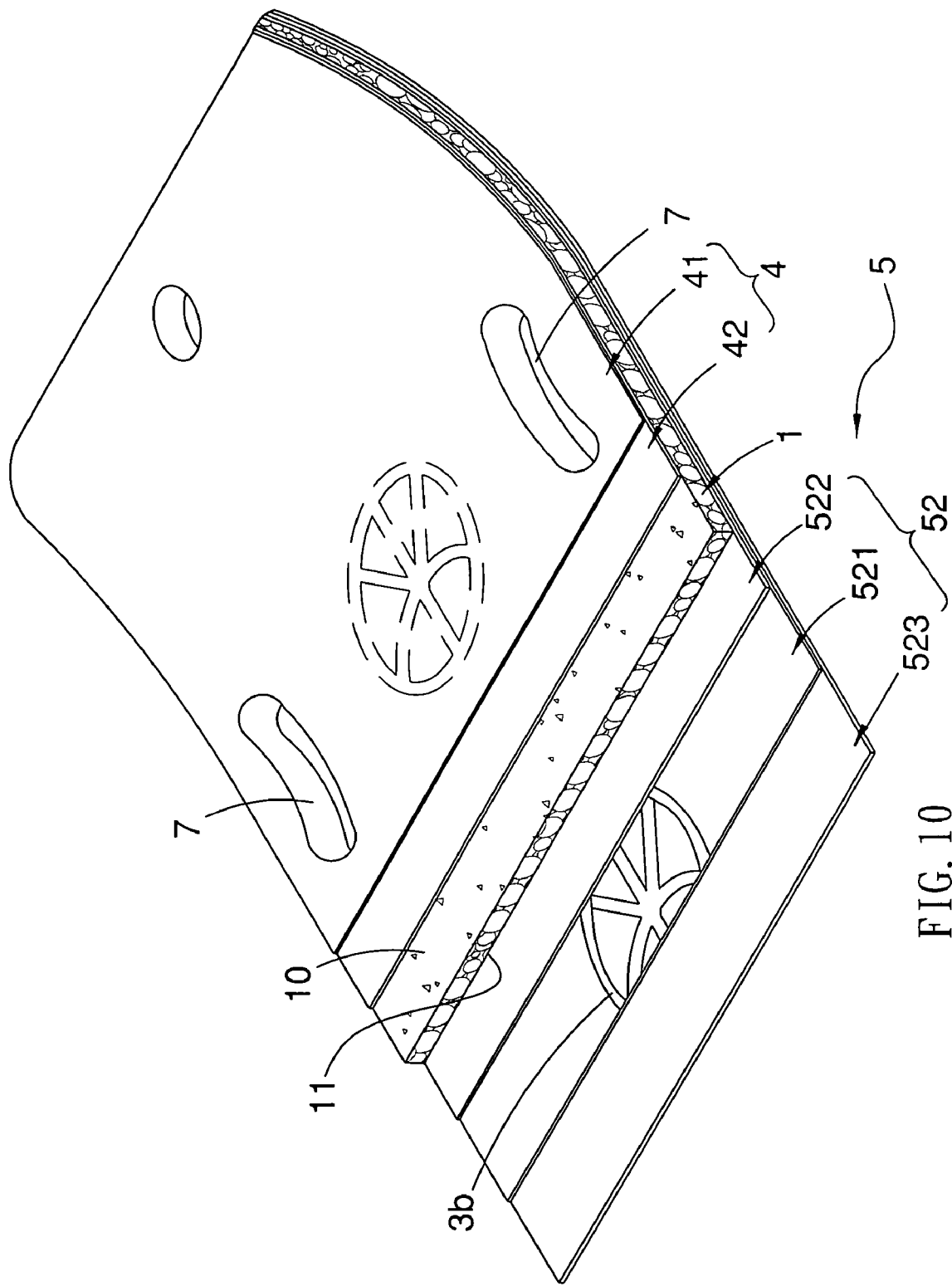
FIG. 10 is a cross sectional view of the eighth embodiment.

With reference to FIG. 10, the eighth embodiment of the invention comprises a polyethylene foam core 1 having a density in the range of 1.5 to 10 PCF, a top layer 4, and a bottom layer 5. The polyethylene foam core 1 has a top surface 10 and a bottom surface 11. Both the top layer 4 and the bottom layer 5 are composite layers and the elements of the composite layers are shown in the above-mentioned embodiments. Furthermore, the eighth embodiment comprises two holes 7 through the slider for being handhold.

Accordingly, the top layer 4 and the bottom layer 5 protect the foam core 1 as well as the first pattern 3a and the second pattern 3b from erosion by exposure to ultraviolet light, moisture and abrasion. Furthermore, the first and second patterns 3a, 3b being visible from outside of the slider that attracts the users attentions.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

I claim:

1. A slider comprising:
    a foam core having a top surface, a bottom surface and edge surfaces, said foam core being a polyethylene foam board;
    a top layer entirely heat laminated to said top surface and edge surfaces of said foam core, said top layer comprises:
        a first outer film having a top surface and a bottom surface;
        a first pattern being printed on said bottom surface of said first outer film, said first pattern being visible from outside of said top layer;
        a first inner film having a top surface and a bottom surface, said top surface being heat laminated to said bottom surface of said first outer film, whereby said first pattern is overlaid; and
        a first polyethylene foam skin having a top surface being heat laminated to said bottom surface of said first inner film and a bottom surface being heat laminated to said top surface and edge surfaces of said foam core, said first polyethylene foam skin having a greater density than the density of said foam core; and
    a bottom layer entirely heat laminated to said bottom surface of said foam core;
    wherein said top surface of said first outer film has a plurality of concaves forming depressions in said top surface and edge surfaces of said first polyethylene foam skin and said first outer film and first inner films are made of plastic.

2. A slider comprising:
    a foam core having a top surface, a bottom surface and edge surfaces, said foam core being a non-polyethylene foam board;
    a top layer entirely heat laminated to said top surface and edge surfaces of said foam core, said top layer comprising:
        a first outer film having a top surface and a bottom surface;
        a first pattern being printed on said bottom surface of said first outer film, said first pattern being visible from outside of said top layer;
        a first inner film having a top surface and a bottom surface, said top surface being heat laminated to said bottom surface of said first outer film, whereby said first pattern is overlaid; and
        a first bonding film having a top surface being heat laminated to said bottom surface of said first inner film and a bottom surface being heat laminated to said top surface and edge surfaces of said foam core; and
    a bottom layer entirely heat laminated to said bottom surface of said foam core;
    wherein said first outer film and first inner films are made of plastic.

3. The slider of claim 2, wherein said bottom layer comprises:
    a second bonding film having a top surface being heat laminated to said bottom surface of said foam core and a bottom surface;
    a second polyethylene foam skin having a top surface being heat laminated to said bottom surface of said second bonding film and a bottom surface; and
    a plastic board having a top surface being heat laminated to said bottom surface of said second polyethylene foam skin.

4. The slider of claim 3, wherein said plastic board comprises:
    a second inner film having a top surface being heat laminated to said bottom surface of said second polyethylene foam skin and a bottom surface;
    a second outer film having a top surface being heat laminated to said bottom surface of said second inner film and a bottom surface;
    a second pattern being pre-printed on said top surface of said second outer film before said top surface being heat laminated to said bottom surface of said second inner film, whereby said second pattern is overlaid; and
    a plate having a surface being heat laminated to said bottom surface of said second outer film, said second pattern being visible from out side of said plate,
    wherein said second outer film, second inner film and plate are made of plastic.

5. A slider comprising:
    a foam core having a top surface, a bottom surface and edge surfaces, said foam core being a non-polyethylene foam board;
    a top layer entirely heat laminated to said top surface and edge surfaces of said foam core, said top layer comprising:
        a first outer film having a top surface and a bottom surface;
        a first pattern being printed on said bottom surface of said first outer film, said first pattern being visible from outside of said top layer;
        a first inner film having a bottom surface and a top surface, said top surface being heat laminated to said bottom surface of said first outer film, whereby said first pattern is overlaid;
        a first polyethylene foam skin having a top surface and a bottom surface, said top surface being heat laminated to said bottom surface of said first inner film; and
        a first bonding film having a top surface being heat laminated to said bottom surface of said first polyethylene foam skin and a bottom surface being heat laminated to said top surface and edge surfaces of said foam core; and
    a bottom layer entirely heat laminated to said bottom surface of said foam core;

wherein said first outer film and first inner films are made of plastic.

6. The slider of claim 5, wherein said top surface of said first outer film has a plurality of conctaves forming depressions in said top surface of said first polyethylene foam skin.

7. The slider of claim 5, wherein said bottom layer comprises:
   a second bonding film having a top surface being heat laminated to said bottom surface of said foam core and a bottom surface;
   a second polyethylene foam skin having a top surface being heat laminated to said bottom surface of said second bonding film and a bottom surface; and
   a plastic board having a top surface heat laminated to said bottom surface of said second polyethylene foam skin.

8. The slider of claim 7, wherein said plastic board comprises:
   a second inner film having a top surface being heat laminated to said bottom surface of said second polyethylene foam skin and a bottom surface;
   a second outer film having a top surface being heat laminated to said bottom surface of said second inner film and a bottom surface;
   a second pattern being pre-printed on said top surface of said second outer film before said top surface being heat laminated to said bottom surface of said second inner film, whereby said second pattern is overlaid; and
   a plate having a surface being heat laminated to said bottom surface of said second outer film, said second pattern being visible from out side of said plate,
   wherein said second outer film, second inner film and plate are made of plastic.

9. A slider comprising:
   a foam core having a top surface, a bottom surface and edge surfaces, said foam core being a polyethylene foam board;
   a top layer entirely heat laminated to said top surface and edge surfaces of said foam core, said top layer comprises:
      a first outer film having a top surface and a bottom surface;
      a first pattern being printed on said bottom surface of said first outer film, said first pattern being visible from outside of said top layer;
      a first inner film having a top surface and a bottom surface, said top surface being heat laminated to said bottom surface of said first outer film, whereby said first pattern is overlaid;
   a bottom layer entirely heat laminated to said bottom surface of said foam core, said bottom layer comprising:
      a polyethylene foam skin having a top surface being heat laminated to said bottom surface of said foam core and a bottom surface; and
      a plastic board having a top surface being heat laminated to said bottom surface of said polyethylene foam skin,
   wherein said polyethylene foam skin has a greater density than a density of said foam core.

10. The slider of claim 9, wherein said plastic board comprises:
   a second inner film having a top surface being heat laminated to said bottom surface of said polyethylene foam skin and a bottom surface;
   a second outer film having a top surface being heat laminated to said bottom surface of said second inner film and a bottom surface;
   a second pattern being pre-printed on said top surface of said second outer film before said top surface being heat laminated to said bottom surface of said second inner film, whereby said second pattern is overlaid; and
   a plate having a surface being heat laminated to said bottom surface of said second outer film, said second pattern being visible from out side of said plate,
   wherein said second outer film, second inner film and plate are made of plastic.

11. A slider comprising:
   a foam core having a top surface, a bottom surface and edge surfaces, said foam core being a polyethylene foam board;
   a top layer entirely heat laminated to said top surface and edge surfaces of said foam core, said top layer comprises:
      a first outer film having a top surface and a bottom surface;
      a first pattern being printed on said bottom surface of said first outer film, said first pattern being visible from outside of said top layer;
      a first inner film having a top surface and a bottom surface, said top surface being heat laminated to said bottom surface of said first outer film, whereby said first pattern is overlaid; and
      a first polyethylene foam skin having a top surface being heat laminated to said bottom surface of said first inner film and a bottom surface being heat laminated to said top surface and edge surfaces of said foam core, said first polyethylene foam skin having a greater density than the density of said foam core; and
   a bottom layer entirely heat laminated to said bottom surface of said foam core, said bottom layer comprising:
      a second polyethylene foam skin having a top surface being heat laminated to said bottom surface of said foam core and a bottom surface; and
      a plastic board having a top surface being heat laminated to said bottom surface of said second polyethylene foam skin,
   wherein said second polyethylene foam skin has a greater density than a density of said foam core and said first outer film and first inner films are made of plastic.

12. The slider of claim 11, wherein said plastic board comprises:
   a second inner film having a top surface being heat laminated to said bottom surface of said second polyethylene foam skin and a bottom surface;
   a second outer film having a top surface being heat laminated to said bottom surface of said second inner film and a bottom surface;
   a second pattern being pre-printed on said top surface of said second outer film before said top surface being heat laminated to said bottom surface of said second inner film, whereby said second pattern is overlaid; and
   a plate having a surface being heat laminated to said bottom surface of said second outer film, said second pattern being visible from out side of said plate,
   wherein said second outer film, second inner film and plate are made of plastic.

13. A composite layer comprising:
   an outer film having a top surface and a bottom surface;
   a pattern being printed on said bottom surface of said outer film and visible from outside of said outer film;

an inner film having a bottom surface and a top surface, said top surface of said inner film being heat laminated to said bottom surface of said outer film, whereby said pattern is overlaid; and a polyethylene foam skin having a bottom surface and a top surface, said top surface being heat laminated to said bottom surface of said inner film, said polyethylene foam skin having a density in the range of 1.5 to 10 PFC;

a plastic board having a top surface being heat laminated to said bottom surface of said polyethylene foam skin;

wherein said top surface of said outer film has a plurality of concaves forming depressions in said top surface of said polyethylene foam skin and said outer film and said inner film are made of plastic.

14. A composite layer comprising:

a first outer film having a top surface and a bottom surface;

a first pattern being printed on said bottom surface of said first outer film and visible from outside of said first outer film;

a first inner film having a bottom surface and a top surface, said top surface of said first inner film being heat laminated to said bottom surface of said first outer film, whereby said first pattern is overlaid; and a polyethylene foam skin having a bottom surface and a top surface, said top surface being heat laminated to said bottom surface of said first inner film, said polyethylene foam skin having a density in the range of 1.5 to 10 PFC;

a plastic board comprising:

a second inner film having a top surface being heat laminated to said bottom surface of said polyethylene foam skin and a bottom surface;

a second outer film having a top surface being heat laminated to said bottom surface of said second inner film and a bottom surface;

a second pattern being pre-printed on said top surface of said second outer film before said top surface of said surface of said second outer film being heat laminated to said bottom surface of said second inner film, whereby said second pattern is overlaid; and a plate having a surface being heat laminated to said bottom surface of said outer film, said second pattern being visible from out side of said plate, wherein said first outer film, first inner film, said second outer film, said second inner film and plate are made of plastic.

* * * * *

(12) EX PARTE REEXAMINATION CERTIFICATE (6388th)
United States Patent
Yeh

(10) Number: US 6,988,920 C1
(45) Certificate Issued: Aug. 19, 2008

(54) SLIDER HAVING IMPROVED RESISTANCE TO EROSION AND WEAR

(76) Inventor: Tzong In Yeh, 4566 Crestwood St., Fremont, CA (US) 94538

Reexamination Request:
No. 90/007,986, Mar. 23, 2006

Reexamination Certificate for:
Patent No.: 6,988,920
Issued: Jan. 24, 2006
Appl. No.: 10/797,094
Filed: Mar. 11, 2004

Related U.S. Application Data

(63) Continuation-in-part of application No. 10/386,634, filed on Mar. 13, 2003, now Pat. No. 6,955,576, which is a continuation-in-part of application No. 10/040,404, filed on Jan. 9, 2002, now abandoned.

(51) Int. Cl.
*B63B 1/00* (2006.01)

(52) U.S. Cl. .......................... 441/65; 441/71
(58) Field of Classification Search .................. 441/65, 441/70, 74
See application file for complete search history.

(56) References Cited

U.S. PATENT DOCUMENTS

| | | | | |
|---|---|---|---|---|
| 4,240,557 A | * | 12/1980 | Dickens | 211/153 |
| 4,687,534 A | * | 8/1987 | Alford et al. | 156/308.6 |
| 4,740,258 A | * | 4/1988 | Breitscheidel | 156/209 |
| 4,850,913 A | * | 7/1989 | Szabad, Jr. | 441/65 |
| 4,867,826 A | * | 9/1989 | Wayte | 156/219 |
| 5,211,593 A | * | 5/1993 | Schneider et al. | 441/65 |
| 5,238,434 A | * | 8/1993 | Moran | 441/74 |
| 5,275,860 A | * | 1/1994 | D'Luzansky et al. | 428/71 |
| 5,658,179 A | * | 8/1997 | Glydon et al. | 441/74 |
| 6,358,599 B1 | * | 3/2002 | Deibel et al. | 428/308.4 |
| 6,773,798 B2 | * | 8/2004 | Ramesh | 428/319.3 |
| 6,794,025 B1 | * | 9/2004 | Laurent et al. | 428/318.6 |
| 6,955,576 B2 | * | 10/2005 | Yeh | 441/65 |
| 2002/0167136 A1 | * | 11/2002 | Lehr et al. | 280/28 |

FOREIGN PATENT DOCUMENTS

| | | | |
|---|---|---|---|
| JP | 55-011877 | * | 1/1980 |
| JP | 02-069228 | * | 3/1990 |
| JP | 10-315326 | * | 12/1998 |

* cited by examiner

*Primary Examiner*—Jimmy G Foster

(57) ABSTRACT

A slider resists erosion due to moisture, dirt and ultraviolet of sunlight and protects a pattern or the bonded surface from wear and tear. The slider contains a foam core, a top layer, a pattern, and a bottom layer. The foam core has a top surface, a bottom surface and edge surfaces. The top layer is a composite layer heat laminated to the top surface and edge surfaces of the foam core. The pattern is formed within the top layer and visible from outside of the top layer. The bottom layer is heat laminated to the bottom surface of the foam core.

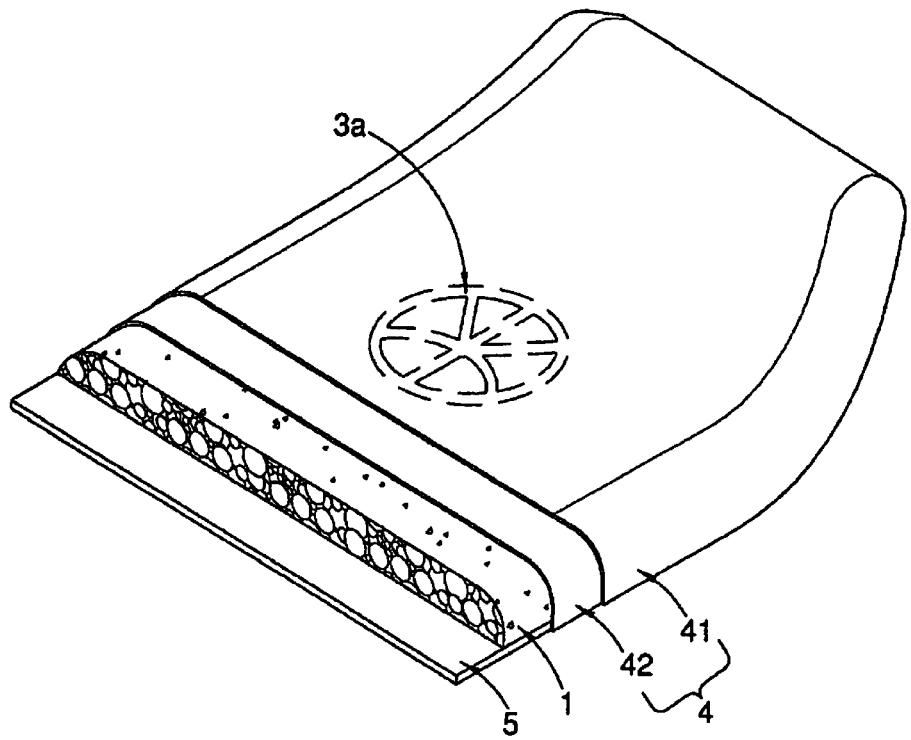

US 6,988,920 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 13 and 14 is confirmed.

Claims 2, 3, 5, 7, 9 and 11 are cancelled.

Claims 4, 6, 8, 10 and 12 are determined to be patentable as amended.

1. A slider comprising:
a foam core having a top surface, a bottom surface and edge surfaces, said foam core being a polyethylene foam board;
a top layer entirely heat laminated to said top surface and edge surfaces of said foam core, said top layer comprises:
  a first outer film having a top surface and a bottom surface;
  a first pattern being printed on said bottom surface of said first outer film, said first pattern being visible from outside of said top layer;
  a first inner film having a top surface and a bottom surface, said top surface being heat laminated to said bottom surface of said first outer film, whereby said first pattern is overlaid; and
  a first polyethylene foam skin having a top surface being heat laminated to said bottom surface of said first inner film and a bottom surface being heat laminated to said top surface and edge surfaces of said foam core, said first polyethylene foam skin having a greater density than the density of said foam core; and
a bottom layer entirely heat laminated to said bottom surface of said foam core;
wherein said top surface of said first outer film has a plurality of concaves forming depressions in said top surface and edge surfaces of said first polyethylene foam skin and said first outer film and first inner films are made of plastic.

4. [The slider of claim 3.] *A slider comprising:*
*a foam core having a top surface, a bottom surface and edge surfaces, said foam core being a non-polyethylene foam board;*
*a top layer entirely heat laminated to said top surface and edge surfaces of said foam core, said top layer comprising:*
  *a first outer film having a top surface and a bottom surface;*
  *a first pattern being printed on said bottom surface of said first outer film, said first pattern being visible from outside of said top layer;*
  *a first inner film having a top surface and a bottom surface, said top surface being heat laminated to said bottom surface of said first outer film, whereby said first pattern is overlaid, wherein said first outer film and first inner films are made of plastic; and*
  *a first bonding film having a top surface being heat laminated to said bottom surface of said first inner film and a bottom surface being heat laminated to said top surface and edge surfaces of said foam core; and*
*a bottom layer entirely heat laminated to said bottom surface of said foam core; said bottom layer comprises:*
  *a second bonding film having a top surface being heat laminated to said bottom surface of said foam core and a bottom surface;*
  *a second polyethylene foam skin having a top surface being heat laminated to said bottom surface of said second bonding film and a bottom surface; and*
  *a plastic board having a top surface being heat laminated to said bottom surface of said second polyethylene foam skin;*
*wherein said plastic board comprises:*
  *a second inner film having a top surface being heat laminated to said bottom surface of said second polyethylene foam skin and a bottom surface;*
  *a second outer film having a top surface being heat laminated to said bottom surface of said second inner film and a bottom surface;*
  *a second pattern being pre-printed on said top surface of said second outer film before said top surface being heat laminated to said bottom surface of said second inner film, whereby said second pattern is overlaid; and*
  *a plate having a surface being heat laminated to said bottom surface of said second outer film, said second pattern being visible from* [out side] *outside of said plate,*
*wherein said second outer film, second inner film and plate are made of plastic.*

6. [The slider of claim 5.] *A slider comprising:*
*a foam core having a top surface, a bottom surface and edge surfaces, said foam core being a non-polyethylene foam board;*
*a top layer entirely heat laminated to said top surface and edge surfaces of said foam core, said top layer comprising:*
  *a first outer film having a top surface and a bottom surface;*
  *a first pattern being printed on said bottom surface of said first outer film, said first pattern being visible from outside of said top layer;*
  *a first inner film having a bottom surface and a top surface, said top surface being heat laminated to said bottom surface of said first outer film, whereby said first pattern is overlaid;*
  *a first polyethylene foam skin having a top surface and a bottom surface, said top surface being heat laminated to said bottom surface of said first inner film, wherein said first outer film and first inner films are made of plastic; and*
  *a first bonding film having a top surface being heat laminated to said bottom surface of said first polyethylene foam skin and a bottom surface being heat laminated to said top surface and edge surfaces of said foam core; and*
*a bottom layer entirely heat laminated to said bottom surface of said foam core;*
*wherein said top surface of said first outer film has a plurality of conctaves forming depressions in said top surface of said first polyethylene foam skin.*

8. The slider of claim [7] *6, wherein said bottom layer comprises:*
   *a second bonding film having a top surface being heat laminated to said bottom surface of said foam core and a bottom surface;*
   *a second polyethylene foam skin having a top surface being heat laminated to said bottom surface of said second bonding film and a bottom surface; and*
   *a plastic board having a top surface heat laminated to said bottom surface of said second polyethylene foam skin;*
   wherein said plastic board comprises:
   a second inner film having a top surface being heat laminated to said bottom surface of said second polyethylene foam skin and a bottom surface;
   a second outer film having a top surface being heat laminated to said bottom surface of said second inner film and a bottom surface;
   a second pattern being pre-printed on said top surface of said second outer film before said top surface being heat laminated to said bottom surface of said second inner film, whereby said second pattern is overlaid; and
   a plate having a surface being heat laminated to said bottom surface of said second outer film, said second pattern being visible from [out side] *outside* of said plate,
   wherein said second outer film, second inner film and plate are made of plastic.

10. [The slider of claim 9,] *A slider comprising:*
   *a foam core having a top surface, a bottom surface and edge surfaces, said foam core being a polyethylene foam board;*
   *a top layer entirely heat laminated to said top surface and edge surfaces of said foam core, said top layer comprises:*
      *a first outer film having a top surface and a bottom surface;*
      *a first pattern being printed on said bottom surface of said first outer film, said first pattern being visible from outside of said top layer;*
      *a first inner film having a top surface and a bottom surface, said top surface being heat laminated to said bottom surface of said first outer film, whereby said first pattern is overlaid;*
   *a bottom layer entirely heat laminated to said bottom surface of said foam core, said bottom layer comprising:*
      *a polyethylene foam skin having a top surface being heat laminated to said bottom surface of said foam core and a bottom surface; and*
      *a plastic board having a top surface being heat laminated to said bottom surface of said polyethylene foam skin,*
   *wherein said polyethylene foam skin has a greater density than a density of said foam core;*
   wherein said plastic board comprises:
   a second inner film having a top surface being heat laminated to said bottom surface of said polyethylene foam skin and a bottom surface;
   a second outer film having a top surface being heat laminated to said bottom surface of said second inner film and a bottom surface;
   a second pattern being pre-printed on said top surface of said second outer film before said top surface being heat laminated to said bottom surface of said second inner film, whereby said second pattern is overlaid; and
   a plate having a surface being heat laminated to said bottom surface of said second outer film, said second pattern being visible from [out side] *outside* of said plate,
   wherein said second outer film, second inner film and plate are made of plastic.

12. [The slider of claim 11,] *A slider comprising:*
   *a foam core having a top surface, a bottom surface and edge surfaces, said foam core being a polyethylene foam board;*
   *a top layer entirely heat laminated to said top surface and edge surfaces of said foam core, said top layer comprises:*
      *a first outer film having a top surface and a bottom surface;*
      *a first pattern being printed on said bottom surface of said first outer film, said first pattern being visible from outside of said top layer;*
      *a first inner film having a top surface and a bottom surface, said top surface being heat laminated to said bottom surface of said first outer film, whereby said first pattern is overlaid; and*
      *a first polyethylene foam skin having a top surface being heat laminated to said bottom surface of said first inner film and a bottom surface being heat laminated to said top surface and edge surfaces of said foam core, said first polyethylene foam skin having a greater density than the density of said foam core; and*
   *a bottom layer entirely heat laminated to said bottom surface of said foam core, said bottom layer comprising:*
      *a second polyethylene foam skin having a top surface being heat laminated to said bottom surface of said foam core and a bottom surface; and*
      *a plastic board having a top surface being heat laminated to said bottom surface of said second polyethylene foam skin,*
   *wherein said second polyethylene foam skin has a greater density than a density of said foam core and said first outer film and first inner films are made of plastic;*
   wherein said plastic board comprises:
   a second inner film having a top surface being heat laminated to said bottom surface of said second polyethylene foam skin and a bottom surface;
   a second outer film having a top surface being heat laminated to said bottom surface of said second inner film and a bottom surface;
   a second pattern being pre-printed on said top surface of said second outer film before said top surface being heat laminated to said bottom surface of said second inner film, whereby said second pattern is overlaid; and
   a plate having a surface being heat laminated to said bottom surface of said second outer film, said second pattern being visible from [out side] *outside* of said plate,
   wherein said second outer film, second inner film and plate are made of plastic.

* * * * *

(12) EX PARTE REEXAMINATION CERTIFICATE (9232nd)
United States Patent
Yeh

(10) Number: US 6,988,920 C2
(45) Certificate Issued: Aug. 21, 2012

(54) SLIDER HAVING IMPROVED RESISTANCE TO EROSION AND WEAR

(76) Inventor: Tzong In Yeh, Fremont, CA (US)

Reexamination Request:
No. 90/009,119, Apr. 21, 2008

Reexamination Certificate for:
Patent No.: 6,988,920
Issued: Aug. 19, 2008
Appl. No.: 10/797,094
Filed: Mar. 11, 2004

Reexamination Certificate C1 6,988,920 issued Jan. 24, 2006

Related U.S. Application Data

(63) Continuation-in-part of application No. 10/386,634, filed on Mar. 13, 2003, now Pat. No. 6,955,576, which is a continuation-in-part of application No. 10/040,404, filed on Jan. 9, 2002, now abandoned.

(51) Int. Cl.
*B63B 1/00* (2006.01)
*B63B 35/73* (2006.01)
*A63C 5/14* (2006.01)

(52) U.S. Cl. .............................................. 441/65; 441/74
(58) Field of Classification Search ........................ None
See application file for complete search history.

(56) References Cited

To view the complete listing of prior art documents cited during the proceeding for Reexamination Control Number 90/009,119, please refer to the USPTO's public Patent Application Information Retrieval (PAIR) system under the Display References tab.

*Primary Examiner* — Robert M. Fetsuga

(57) ABSTRACT

A slider resists erosion due to moisture, dirt and ultraviolet of sunlight and protects a pattern or the bonded surface from wear and tear. The slider contains a foam core, a top layer, a pattern, and a bottom layer. The foam core has a top surface, a bottom surface and edge surfaces. The top layer is a composite layer heat laminated to the top surface and edge surfaces of the foam core. The pattern is formed within the top layer and visible from outside of the top layer. The bottom layer is heat laminated to the bottom surface of the foam core.

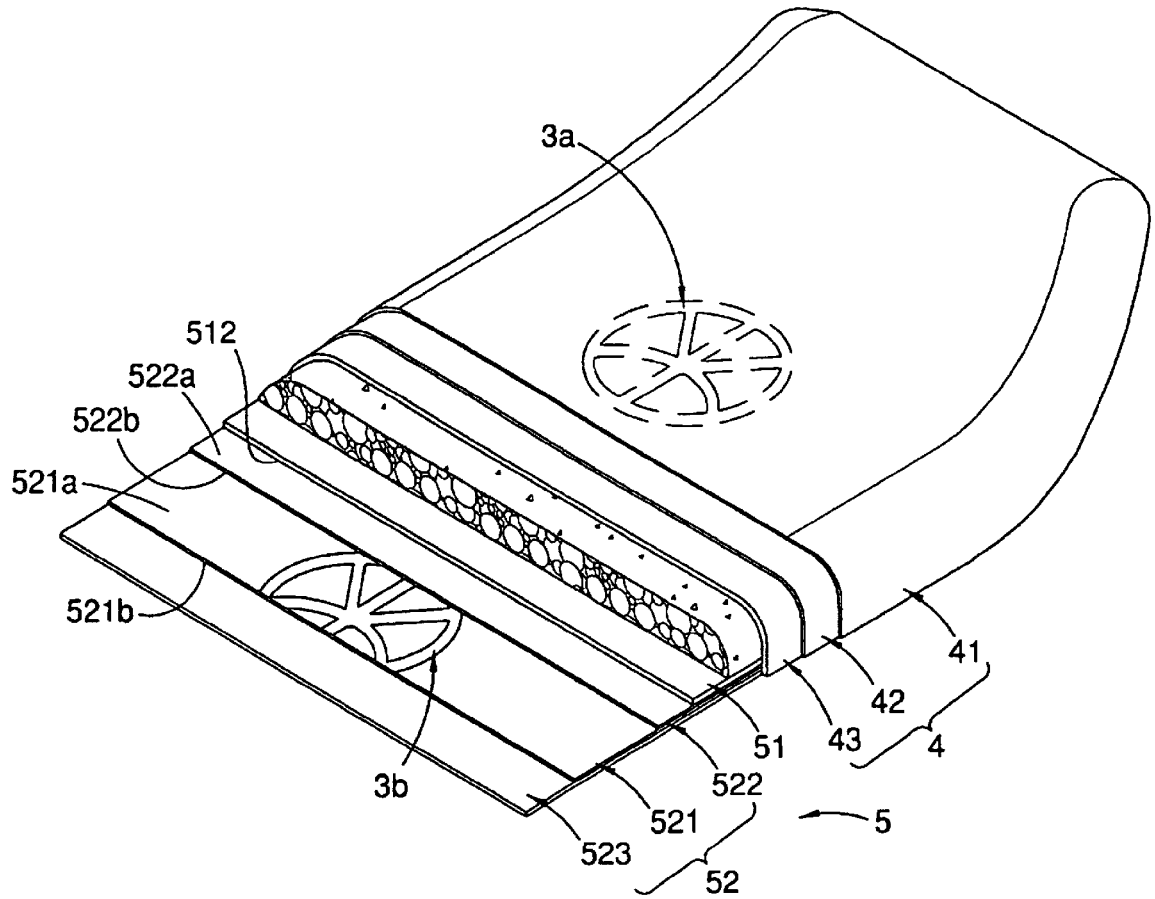

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4, 8, 10 and 12-14 is confirmed.

Claims 2, 3, 5, 7, 9 and 11 were previously cancelled.

Claims 1 and 6 are cancelled.

New claims 15 and 16 are added and determined to be patentable.

*15. The slider of claim 13, wherein said concaves are embossed concaves.*

*16. The slider of claim 13, wherein the plastic board includes:*

*a second inner film having a top surface being heat laminated to said bottom surface of said polyethylene foam skin and a bottom surface;*

*a second outer film having a top surface being heat laminated to said bottom surface of said second inner film and a bottom surface;*

*a second pattern being pre-printed on said top surface of said second outer film before said top surface being heat laminated to said bottom surface of said second inner film, whereby said second pattern is overlaid; and*

*a plate having a surface being heat laminated to said bottom surface of said second outer film, said second pattern being visible from outside of said plate,*

*wherein said second outer film, second inner film and plate are made of plastic.*

\* \* \* \* \*